(No Model.)

C. PRÜSMANN.
SAFETY VALVE.

No. 511,650.  Patented Dec. 26, 1893.

WITNESSES:
E. Wolff.
Chas. C. Poengen.

INVENTOR:
Carl Prüsmann.
BY
Hauff & Hauff
ATTORNEYS.

UNITED STATES PATENT OFFICE.

CARL PRÜSMANN, OF MAGDEBURG-BUCKAU, GERMANY, ASSIGNOR TO SCHÄFFER & BUDENBERG, OF SAME PLACE.

SAFETY-VALVE.

SPECIFICATION forming part of Letters Patent No. 511,650, dated December 26, 1893.

Application filed October 5, 1893. Serial No. 487,263. (No model.)

*To all whom it may concern:*

Be it known that I, CARL PRÜSMANN, a subject of the King of Prussia, residing at Magdeburg-Buckau, Germany, have invented new and useful Improvements in Safety-Valves, of which the following is a specification.

This invention relates to an improvement in safety valves and the invention consists in the novel features pointed out in the following specification and claims and illustrated in the annexed drawings, in which—

Figure 1:
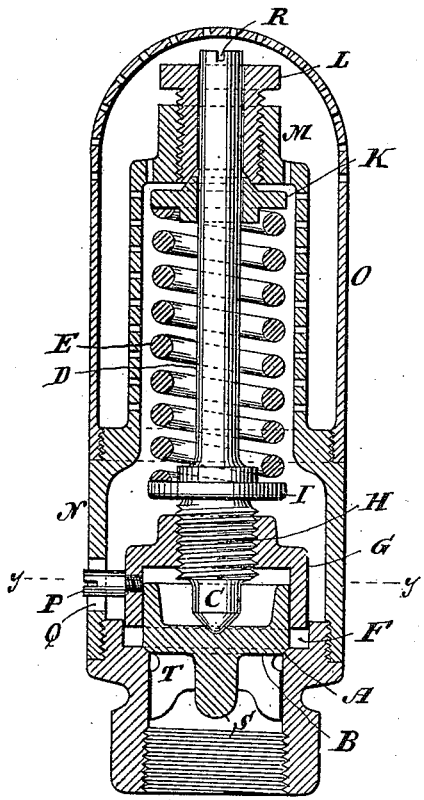
Figure 2:
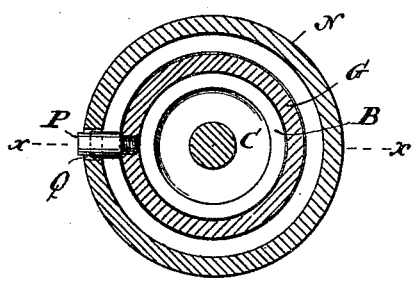

Figure 1 is an elevation of the valve sectioned along $xx$ Fig. 2. Fig. 2 is a section along $yy$ Fig. 1.

In the drawings the letter A indicates the seat for the safety valve B. Onto this valve presses the end C of a spindle D exposed to the action of spring E so that the valve B rests on its seat and a certain pressure is required to move the valve from its seat against the action of the spring. The valve seat A is provided with an offset forming a chamber or space F for the reception of the cap piece G surrounding or overhanging the valve B. The cap piece G is tapped for the reception of the screw thread H on spindle D. The spring E is braced against a flange or shoulder I on the screw or spindle D and against a washer or ring K surrounding the spindle D. By turning the screw L the ring K is set so as to tighten or relieve the spring E as required. The screw L surrounds the spindle D and said screw can turn freely about the spindle. The screw L is seated in the sleeve M rising from the casing N. A cap O can be screwed or set onto the casing N. The cap piece G is capable of vertical or rectalinear play but is prevented from turning by a screw or stud P entering a slot Q.

The action of the device is as follows: In case sufficient pressure acts on the valve B to force the latter from its seat against the action of spring E, such pressure passing through the valve seat A will not escape directly into the open air, but first enters the chamber F where said pressure encounters the cap piece G. Said cap piece offering an enlarged surface for the action of the pressure as compared with valve B the valve will be forced away from its seat with increased energy or in other words the valve will "pop." By turning the screw or spindle D the cap piece G will be set more or less into the chamber F so that the popping action can be increased or diminished. The spindle D thus acts as a set screw for the cap piece G. The turning of the screw or spindle D to set the cap piece G will not affect the tension or setting of spring E, while the turning or setting of the screw L to set the spring E will not affect the spindle D. The cap piece G and spring E can thus be readily set independently of one another after the parts are put together.

The set screw or spindle D can be provided with a slot R or otherwise adapted for the engagement of a screw driver or tool for the rotation of said spindle. The valve B can be guided by means of a stem S led in a suitable spider or guide T.

What I claim as new, and desire to secure by Letters Patent, is—

1. The combination with a valve of a cap piece, a set screw or spindle connected to the cap piece and a spring made to act on the spindle substantially as described.

2. The combination with a valve of a cap piece, a set screw or spindle connected to the cap piece, a spring made to act on the spindle and a set screw as L for the spring said set screw L being made to surround the spindle substantially as described.

3. The combination with a valve having its seat provided with an enlargement or chamber of a cap piece made to enter the chamber, a set screw or spindle for setting the cap piece in the chamber and a spring made to act on the spindle substantially as described.

In testimony whereof I have hereunto set my hand in the presence of two subscribing witnesses.

CARL PRÜSMANN.

Witnesses:
WM. C. HAUFF,
E. F. KASTENHUBER.